3,095,388
DISPERSION POLYMERISATION OF AN ACRYLATE IN THE PRESENCE OF A RUBBER AND A NON-POLAR ORGANIC SOLVENT AND PRODUCT OBTAINED
Desmond Wilfrid John Osmond, Iver Heath, and Horace Henry Thompson, Slough, England, assignors to Imperial Chemical Industries Limited, London, England, a corporation of Great Britain
No Drawing. Filed Jan. 29, 1962, Ser. No. 169,609
Claims priority, application Great Britain May 27, 1957
22 Claims. (Cl. 260—4)

This invention relates to a new process for the polymerisation of acrylic monomers to produce stable dispersions of the polymers in organic liquid. The invention also relates to new stable dispersions of acrylic polymers in organic liquid and to coating compositions based on such dispersions.

By the term "acrylic" is meant the members of the group consisting of acrylic acid and methacrylic acid, and lower esters, amides and nitriles thereof.

Acrylic polymers in general have a clarity and stability which make them desirable molding materials and film-forming materials for use in coating compositions. Further, they readily copolymerise to produce copolymers in which the properties of hardness, toughness and flexibility, may be varied over a wide range according to requirements. Of the acrylics, polymethyl methacrylic is very highly regarded as a film-former in coating compositions because of its crystal clarity, high gloss and durability on exposure to atmospheric conditions.

Polymethyl methacrylate has been said, for example, in coating compositions for automobiles and gives a finish of excellent appearance and durability. Unfortunately, it has so far only been possible to formulate these coating compositions as solutions of the polymethacrylate in organic solvent. In solution the polymer has, of course, a profound effect on the viscosity of the coating composition and since there are critical viscosity limits above which coating compositions cannot be applied by production-line spray techniques this restricts the proportion and molecular weight of the methacrylate polymer used in the coating composition. In practice, the solution-type coating compositions cannot contain more than about 20% by weight of polymethyl methacrylate of molecular weight of 60,000 to 70,000.

If the proportion of polymer could be raised then fewer applications of composition would be required to obtain any particular coating thickness. Also, if the molecular weight of the polymer could be raised a tougher film would result. Unfortunately, in solution-type compositions an increase in molecular weight results in a higher viscosity, unless the polymer content is reduced in compensation.

Such difficulties could be overcome by using as the basis of coating compositions, not a solution of the acrylic polymer, but a dispersion thereof in organic liquid. Until now, however, acrylic polymer dispersions in organic liquid could only be made by grinding or precipitating preformed polymer in organic liquid and attempting to stabilise the resulting dispersion by means of a conventional surface active agent. These dispersions are not particularly stable and have poor rheological properties, probably due to the fact that the energy of adsorption of the surface active agent on the polymer particles is not great enough to form an adequate protective layer of solvated groups on the polymer surface. For the same reason, polymerisation of acrylic monomer in an organic liquid in which the polymer is insoluble, even in the presence of a conventional surface active agent, results not in a fine, stable, dispersion but in a sticky or glassy layer on the reaction vessel or in coarse granules.

We have now found that a stable dispersion of acrylic polymer in organic liquid may be prepared by polymerising at least one monomer selected from the group consisting of acrylic acid and methacrylic acid, lower esters, amides and nitriles thereof in an inert relatively non-polar organic liquid in which the polymer is insoluble, the liquid containing a catalyst for the polymerisation of said monomer and a member of the group consisting of organic block and graft copolymers of which one constituent is rubber which is soluble in said organic liquid and another constituent is insoluble in the organic liquid and compatible with the polymer being formed.

The organic block or graft copolymer may be preformed and added to the reaction mixture as such. On the other hand the polymer dispersion may be stabilised by polymerising the monomer in the presence of rubber in solution in the reaction mixture. In these circumstances the rubber forms a stabilising block or graft copolymer with part of the monomer being polymerised, this part of the polymerised monomer forming the other constituent of the block or graft copolymer. In this case since this other constituent is formed from the same monomer as the main body of disperse polymer it inherently is also insoluble in the organic liquid and is compatible with the disperse polymer. In each case the compatible constituent becomes inextricably entangled with the polymer chains being formed in the process and hence becomes an integral part of the disperse particles. The rubber which, being soluble, provides the stabilising solvated constitutent is thus irreversibly attached to the disperse particles through the primary chemical bonds of the block or graft copolymer.

The polymer dispersions produced by the processes of this invention are of particular value in coating compositions since they are substantially deflocculated as compared with dispersions which previously had to be made by forming a polymer in aqueous phase and then dispersing it in organic liquid. Consequently the rheological characteristics of coating compositions based on the dispersions of the present invention are substantially improved. In addition, they provide wider ranges of particle size and molecular weight than where available by the old process, these two factors also being of particular importance in coating compositions in that together with the improved rheological characteristics they make possible the formulation of coating compositions which yield glossy pigmented films. Pigments and plasticisers may be incorporated in the coating composition in the various ways common in the art.

Further, in contrast with dispersions formed by polymerisation in aqueous medium which are contaminated by conventional emulsifying and stabilising agents, often of an ionic nature, the dispersion polymers of the present invention at most contain only small amounts of compatible copolymer. They may, therefore, be precipitated, dried, or otherwise separated from the liquid phase, to produce polymers with improved physical and electrical characteristics.

The disperse polymer produced by the processes of this invention may be a homopolymer or copolymer, but is referred to throughout this specification as polymer.

The preferred acrylic monomers for use in the production of polymers for the preparation of coating compositions by this process are methyl methacrylate, β-ethoxy ethyl methacrylate, ethyl acrylate, acrylonitrile, methacrylic acid and acrylic acid, and the amides of these acids. Combinations of the above monomers may be used.

The block or graft copolymer which stabilises the polymer dispersions have the structure normally implied by the term "block or graft," i.e. they comprise copolymers in which the constituents are present not as random monomer units but as a chain of one polymer to which is attached one or more chains of another polymer. The chains of polymer may comprise one monomer or a random arrangement of two or more monomers.

As stated above the compatible constituent must also be insoluble in the organic liquid as is the polymer and preferably the polymer chains of this constituent should be similar in length to those of the polymer to be dispersed. The solvatable chain may range in size from that of a conventional stabilising agent up to a molecular weight of $10^6$ or more. However, since at chain lengths below about 1000 molecular weight relatively large proportions of solvatable constituents are required, and even then the dispersions tend to be rather coarse, we prefer to use solvatable constituents of at least 1000 molecular weight. Particularly satisfactory dispersions are obtained using solvatable constituents of from 1000 to 100,000 molecular weight, preferably 1500 to 10,000.

Where the block or graft copolymer is added as such, any catalyst normally used in the formation of the polymer may be used in the processes of the present invention. Where the block or graft copolymer is formed in situ at the same time as the polymer it must be borne in mind that the catalyst must be effective not only in the formation of the disperse polymer but also in the formation of the block or graft copolymer. Also, where it is desired to control the molecular weight of the disperse polymer by a chain transfer agent, or retarder, any agent normally suitable for use with a given monomer may be used in the processes of this invention provided that where the block or graft copolymer is formed in situ the agent does not excessively inhibit the normal formation of the copolymer.

To produce a dispersion, the polymer must be substantially insoluble in the organic liquid; consequently the nature of the polymer to be dispersed determines the nature of the organic liquid since, for the polymer to be insoluble, the organic liquid must generally be of a different degree of polarity. The acrylic polymers of this invention are all polar in nature and for this reason a relatively non-polar organic liquid is used as the non-solvent continuous phase of the dispersion. For example, with a polymer such as methyl acrylate, $\beta$-ethoxy ethyl methacrylate or acrylonitrile, a suitable organic liquid is an aliphatic hydrocarbon such as white spirit or iso-octane. In conjunction with polyacrylonitrile, a suitable organic liquid would be an aromatic hydrocarbon such as benzene. Benzene is, of course, more polar than white spirit, but the essential point is that in each dispersion the organic liquid is non-polar relative to the polymer and consequently is not a solvent for it. Other suitable relatively non-polar organic liquids are readily apparent, for example, long chain ketones and alcohols such as cetyl alcohol.

It becomes possible, having determined the nature of the polymer and organic liquid, to select suitable constituents of the block or graft copolymer.

Since most polymers have only limited compatibility with other polymers the choice of the compatible constituent of the block or graft copolymer is somewhat limited and preferably it is of the same material as the disperse polymer or closely related thereto. Where the block or graft copolymer is being formed in situ no difficulty arises since it is then possible to utilise in the copolymer some of the monomer being polymerised or some of the low polymer formed in the course of the polymerisation. The compatible constituent will then be identical with the disperse polymer. Where a free radical catalyst such as a peroxide is used in the dispersion polymerisation the solvatable constituent of the block or graft copolymer to be formed should contain an unsaturated carbon-carbon bond, tertiary carbon atom or other equivalent active group, capable of being activated under the reaction conditions. The unsaturated carbon-carbon bond may also be activated by non-peroxide free radical catalysts, such as azodiisobutyronitrile, under oxidising conditions. For example, when dispersion-polymerising methyl methacrylate in a liquid hydrocarbon, a low molecular weight unsaturated rubber may be added as the solvatable constituent of the copolymer.

Where the block or graft copolymer is added as such to the polymerisation mixture or to a solution of the polymer to be precipitated the compatible constituent is usually identical with, or closely related to, the polymer to be produced. For example, when the disperse polymer is methyl methacrylate the compatible constituent of the block or graft copolymer may be methyl methacrylate or a copolymer of methyl methacrylate and butyl methacrylate, preferably one containing a major proportion of the methyl ester.

A simple test of compatibility is to dissolve in the same solvent polymeric material of the type to be dispersed and polymeric material of the type proposed for use as the compatible constituent of the block or graft copolymer, mix the dissolved polymers in the proportions which will be present in the disperse particles and cast a film from the mixed solutions. If the film is clear then the two polymeric materials are compatible.

The nature of the solvatable constituent is determined by the nature of the organic liquid in which the polymer is to be dispersed. In contrast to the disperse polymer this constituent of the block or graft copolymer should be of a similar degree of polarity to the organic liquid. Suitable combinations are polyisoprene with white spirit, or polyisobutylene with petroleum hydrocarbons.

Where the block or graft copolymer is to be formed in situ during the formation of the polymer the solvatable constituent must be added to the organic liquid as a polymer which will provide the polymer chains required in the block or graft copolymer. Where the polymer is to be formed in a non-solvent organic liquid, solution of the polymer providing the solvatable constituent is, of course, evidence that this constituent is solvatable.

When added as such to the reaction mixture the block or graft copolymers may be prepared by conventional methods. For example, to prepare a graft copolymer, an unsaturated polymer such as degraded natural rubber or a copolymer of vinyl toluene and butadiene may be reacted with an acrylate monomer, for example, methyl methacrylate in a common solvent such as benzene with a peroxide catalyst such as benzoyl peroxide. Where the block or graft copolymer is added to the polymerisation mixture and it is undesirable that further block or graft copolymerisation should occur during the disperse polymerisation the catalyst or conditions of the polymerisation may be so chosen that polymerisation only of the monomer takes place.

Other methods of block or graft polymerisation may be used such as mastication, radiation and other chemical methods.

In all cases the organic liquid used as the polymerisation and/or the dispersion medium need not necessarily be a single liquid but may well be a mixture of two or more. This may be a matter of some importance when the dispersions are to be used, for example, as coating compositions and it is desirable to be able to control the volatility of the liquid. Suitable combinations which may be used are isooctane with high boiling petroleum fractions (paraffin).

The proportion of rubber constituent required in the stable dispersion will depend on the molecular weight of the rubber, the desired particle size of the dispersion, polymer concentration, etc. In general, the higher the proportion of rubber constituent, the finer and more stable will be the dispersion but against this must be balanced the possibly disadvantageous feature that the dispersion may be thicker. Proportions of from 0.1% to 10% by weight of the polymer to be dispersed, preferably from 0.5% to 5%, are suitable. In general, the higher the molecular weight of the rubber, the lower the proportion required in the manufacture of stable dispersions.

Other surface active agents may be used in the processes of the present invention but are not necessary to obtain a stable dispersion.

The proportion of polymer which may be obtained in the final polymer dispersion by this process can be varied widely, for example, within the range 5–65% of polymer solids in the final dispersion. Preferably, the dispersions have a solids content of between 25 and 50%. If higher solids content is required it is possible to increase the solids content of a dispersion by evaporation of part of the liquid, if necessary under reduced pressure.

Dispersion of average particle sizes varying from 0.05 micron to 2.0 microns may be produced, and molecular weight of the disperse polymer may range from less than 20,000 to 1,000,000 or more.

Dispersions of polymers having a molecular weight in the range 50,000 to 250,000 are particularly suitable for use in coating compositions. In coating compositions which are to be stoved at 100–150° C. dispersions of polymers having a molecular weight of 100,000 to 250,000 are suitable. In coating compositions which are to be dried at 75–100° C. dispersions of polymers having a molecular weight of 60,000 to 100,000 are suitable.

For use in coating compositions we prefer dispersions of a polymer of acrylic or methacrylic acid or of an ester, amide or nitrile of such an acid, the organic liquid being hydrocarbon, either aliphatic or a mixture of aliphatic and aromatic. It is also preferred that in such dispersions the stabilising solvatable constituent is derived from degraded natural rubber or an unsaturated synthetic rubber.

We have found that a group of degraded rubbers is particularly useful in the preparation of polymer dispersions to be used in coating compositions. Since molecular weights are difficult to determine the group is best characterised by reference to the reduced viscosity of the rubbers.

Reduced viscosity is determined by the formula:

$$\frac{\eta \text{ solution} - \eta \text{ solvent}}{\eta \text{ solvent}} \times \frac{1}{C}$$

where $\eta$ solution is the viscosity of a solution of the polymer in benzene, $\eta$ solvent is the viscosity of benzene and C is the concentration of the solution in gms./dl. Degraded rubber is natural rubber which has been reduced in molecular weight and chemically modified by subjection to heat treatment and high rates of shear. Preferably, degraded rubber has a reduced viscosity as defined of 0.2 to 0.5 and more preferably 0.25–0.35.

If the polymer dispersion is to be used in coating compositions it must meet two fundamental requirements. First, the polymer itself must have properties which render it inherently suitable as a coating, e.g. it should have such lustre that it can produce a highly glossy film, and then it must be sufficiently stable to atmospheric conditions to resist weathering and sufficiently hard to resist abrasion, both of which influences reduce gloss unless effectively resisted. It is for this reason that acrylate polymers are preferred. Secondly, the dispersion itself should have such characteristics that a glossy film is produced on application of the coating composition, i.e. little or no rubbing down and polishing of the dry film should be required. The production of a glossy film on application of composition is dependant largely on two characteristics of the dispersion, i.e. the size of the disperse particles and the extent of deflocculation. If the particles are not greater than the wavelength of light and if they are so substantially deflocculated that regular close packing of the disperse particles can take place on drying the coating composition, then a glossy film will result.

There is also a third characteristic which is desirable from the economic point of view; this is that the polymer content of the dispersion should be as high as possible.

Where the dispersion is produced in situ by polymerisation with concurrent formation of block or graft copolymer these characteristics of the dispersion, i.e. particle size, degree of deflocculation and solids content are, for a given polymer, largely dependant on the nature of the solvatable constituent of the block or graft copolymer.

Whilst dispersions of the general type disclosed in this specification are of a much better degree of deflocculation than those made by forming the polymer in aqueous phase and then grinding it in organic liquid and stabilising the disperse particles by means of a conventional stabilising agent, we have found that using degraded rubber of reduced viscosity in the selected ranges referred to above even better deflocculation can be obtained with reduced risk of thickening the dispersion.

We have also found that the selected range of degraded rubbers have a higher grafting efficiency and consequently are more effective as stabilisers in that more of the stabilising block or graft copolymer is formed.

The improved degree of deflocculation using the selected degraded rubbers leads to the possibility of producing coating compositions which after application, e.g. by spray gun, dry to a glossy film.

The invention is illustrated by the following examples in which all parts are by weight.

*Example 1*

730 parts of methyl methacrylate, 20 parts of methacrylamide, 200 parts of petroleum ether boiling between 80° C. and 100° C. and 20 parts of crepe rubber dissolved in 800 parts of white spirit were charged into a vessel equipped with a stirrer and a cooling coil and open to the air via a reflux condenser. The charge was raised to 70° C. and 16 parts of a 65% solids paste of benzoyl peroxide in dimethyl phthalate added. Within 30 minutes the contents of the vessel had begun to whiten and thereafter the reaction proceeded so rapidly that passage of water through the cooling coil was necessary to keep the temperature down to 70° C. Three hours after the addition of the catalyst the dispersion solids were 41% and the reaction was stopped. The molecular weight of the polymer, as determined from viscosity measurements was 350,000 and the particle size about $0.3\mu$.

*Example 2*

To 250 parts of odourless mineral spirits and 250 parts of iso-octane in which were dissolved 10 parts of polyisobutylene and 5 parts of the oil-soluble wetting agent "Lubrol" MO.a were added 250 parts of methyl methacrylate and 10 parts of re-distilled methacrylic acid. After heating, with gentle stirring, to 95° C. on a steam bath 0.4 part of benzoyl peroxide, as a solution of 6.5% solids in dimethyl phthalate, were added, followed by further additions equivalent to 0.2 part catalyst in each case at intervals of five hours. As before, the initially clear reaction mixture changed to a milky white dispersion and after eighteen hours reaction the solids were 30%.

At this stage the reaction vessel was placed under reduced pressure and the iso-octane and the residual monomer distilled off to yield a syrupy dispersion of 52% solids. The molecular weight was 220,000 and the particle size $1.0\mu$.

*Example 3*

660 parts of methyl methacrylate, 16.5 parts of the oil-soluble wetting agent "Lubrol" MO.a and 16.5 parts of crepe rubber dissolved in a mixture of 490 parts of white spirit and 759 parts of petroleum ether boiling between 100° C. and 120° C. were charged into the apparatus of Example 1 above and raised to 90° C. 0.66 part of $\alpha,\alpha'$-azodiisobutyronitrile were added and the reaction mixture maintained at 90° C. for four and a half hours, using the cooling coil as necessary during the earlier part of the reaction. The final product was a thin dispersion of 32% solids. The molecular weight of the polymer was 450,000 and the particle size $0.4\mu$ to $0.7\mu$.

*Example 4*

1,500 parts of commercial methyl methacrylate monomer, 3,000 parts of white spirit and 75 parts of a degraded rubber solution made by milling crepe rubber in a heated pug mill until it was reduced to the consistency of a viscous liquid (molecular weight about 30,000 by viscosity measurement), cooling and thinning with an equal weight of white spirit, were placed in a reactor equipped with a stirrer, cooling coil, thermometer, and a reflux condenser venting to the atmosphere.

The contents of the reactor were heated to 85° C. and 5 parts of a 65% solids paste of benzoyl peroxide in dimethyl phthalate added. After 30 minutes the batch began to whiten and it was then cooked at 85° C. for 5 hours using the cooling coil as necessary during the exothermic phase of the reaction. A thin, creamy white dispersion of 32% solids was formed.

The particle size of this dispersion as judged from electron micrographs was in the range of $0.1\mu$ to $0.5\mu$ with the bulk about $0.25\mu$. The molecular weight of the disperse polymer, as judged from viscosity measurements was 350,000.

*Example 5*

Example 4 was repeated using only 16 parts of the degraded rubber solution. The final product was a very thin, whitish dispersion containing small amounts of granular polymer. The range of particle size was from $0.3\mu$ to $1.2\mu$ with the bulk about $0.8\mu$. The molecular weight of the disperse polymer was 380,000.

*Example 6*

Example 4 was repeated using 160 parts of the degraded rubber solution. The final product was a thick, creamy dispersion tending to set to a weak gel on standing. The particle size ranged from $0.05\mu$ to $0.3\mu$ with the bulk at $0.2\mu$.

*Example 7*

Example 4 was repeated using a mixture of 1,000 parts of β-ethoxy ethyl methacrylate, 400 parts of ethyl acrylate and 100 parts of maleic acid in place of the methyl methacrylate. The weight of catalyst paste was also increased to 7.5 parts. A good, fairly thin, yellowish white dispersion was formed, having a solids of 31% and a particle size of about $0.5\mu$. The molecular weight was not determined.

*Example 8*

Example 7 was repeated using 800 parts of acrylonitrile in place of the β-ethoxy ethyl methacrylate. Further, the cooking temperature was lowered to 75° C., the system was purged with inert gas and the catalyst increased to 15 parts of paste. After 4 hours a yellowish, opalescent dispersion of 28% solids had been formed although there had been some build-up of coagulated polymer on the reactor. This dispersion had the fine average particle size of $0.08\mu$.

*Example 9*

Example 4 was repeated using a mixture of 1,500 parts of 100–120° C. boiling range petroleum ether and 1,500 parts of an industrial paraffin boiling above 170° C. in place of the white spirit. At the end of the reaction, however, the reactor was placed under water-pump vacuum and about 1,400 parts of diluent distilled off over a temperature range from 37° C. to 55° C. to yield a slightly thick dispersion of 49% solids. The particle size and molecular weight of the disperse polymer in this final high solids dispersion were not significantly different from the corresponding values for the polymer of Example 4.

*Example 10*

Example 6 was repeated using 80 parts of a low molecular weight (about 1,500 by viscosity measurement) synthetic polybutadiene in place of the degraded rubber solution. A product substantially similar to that of Example 6, but slightly coarser in particle size and much lower in viscosity was obtained.

*Example 11*

Example 4 was repeated using 37.5 parts of solid gutta percha in place of the degraded rubber solution. A product substantially similar to that of Example 4 was obtained.

*Example 12*

Using the apparatus described in Example 4 a mixture of:

| | Parts |
|---|---|
| Methyl methacrylate | 600 |
| White spirit | 1,200 |
| 30 poises linseed stand oil (prepared in the absence of air) | 30 |
| Solid benzoyl peroxide | 2 | was heated at 85° C. for 2½ hours. A very thin silvery white polymer dispersion was obtained. The solids content was 29% and the particle size approximately $1.0\mu$.

*Example 13*

A graft copolymer was prepared as follows: 70 parts of methyl methacrylate, 30 parts of butyl methacrylate and 100 parts of a non-volatile degraded rubber (molecular weight about 10,000 by viscosity measurement) were dissolved in 100 parts of benzene, together with 7.5 parts of a 65% solids paste of benzoyl peroxide in dimethyl phthalate. The batch was cooked at 80° C. for 5 hours when the solids were found to be 44%.

Example 4 was repeated using 32 parts of this solution of graft copolymer in place of the degraded rubber solution.

An excellent dispersion, quite free from granular polymer, with an average particle size of about $0.3\mu$ was obtained.

*Example 14*

Example 13 was repeated, except that in the main polymerisation in the presence of the graft copolymer 5.0 parts of the catalyst azodiisobutyronitrile were used in place of the 5.0 parts of benzoyl peroxide paste.

A good dispersion, substantially similar to that of Example 13, but slightly coarser in particle size, was obtained.

*Example 15*

A graft copolymer solution was prepared by heating for 5 hours at 80° C. a solution of 100 parts of methyl methacrylate and 100 parts of a non-volatile degraded rubber (molecular weight about 23,000 by viscosity measurement) in 200 parts of benzene, 7.5 parts of a 65% solids paste of benzoyl peroxide in dimethyl phthalate being added as catalyst.

2,300 parts of methyl methacrylate and 2,200 parts of white spirit were charged into the apparatus of Example 4 together with 46 parts of this graft copolymer solution (equivalent to approximately 12 parts of solvatable or rubbery component). The batch was heated to 85° C. and 4 parts of 65% solids benzoyl peroxide paste added. Within a few minutes the batch whitened and a strongly exothermic reaction occurred needing vigorous cooling. After 2 hours the solids were 52% and an excellent white dispersion, quite thin and free from granular coagulum had formed. The average particle size of the disperse polymer was $0.4\mu$ and its molecular weight approximately 1,500,000.

*Example 16*

Example 15 was repeated with the addition of 23 parts of lauryl mercaptan and with the catalyst increased from 4 parts to 8 parts of 65% solids paste. The reaction proceeded quite quietly and after 4 hours there had been formed a thin, silvery white dispersion of 47% solids, having a particle size of about $0.8\mu$ and a disperse polymer molecular weight of 138,000.

*Example 17*

2,000 parts of 60–80° C. boiling range petroleum ether and 1,000 parts of white spirit were charged, together with 20 parts of non-volatile degraded rubber (as used in Example 15) and 50 parts of 65% solids paste of benzoyl peroxide in dimethyl phthalate, into the apparatus of Example 4. The temperature was raised to 65° C. and 1,000 parts of methyl methacrylate were dripped into the reaction mixture at a rate of 200 parts per hour. When all the monomer had been added the batch was cooked for a further 30 minutes. About 1,500 parts of diluent were then distilled off up to a final boiling point of 88° C. at atmospheric pressure. The resultant dispersion was slightly thick, had an average particle size of about $0.2\mu$ and a molecular weight of 103,000.

*Example 18*

This example illustrates the use of the dispersions of this invention in coating compositions.

A coating composition was prepared based on the following formulation:

| | |
|---|---|
| Dispersion of Example 17 | 100 parts. |
| Methylcyclohexanyl phthalate | 24 parts. |
| Rutile titanium dioxide | 18 parts. |
| Dispersing aid | 0.5 part. |
| Aliphatic hydrocarbon | To spray viscosity. |

The pigment was dispersed in 8 parts of the phthalate plasticiser using long oil alkyd resin as a dispersing aid. Sufficient aliphatic hydrocarbon was added to enable the pigment dispersion to be carried out in a ball mill. The other 16 parts of plasticiser were stirred into the polymer dispersion into which the pigment dispersion was then stirred. The composition was filtered and thinned to spraying viscosity with aliphatic hydrocarbon.

The composition was spray applied to a primed metal panel, allowed to flash dry and then stoved for 30 minutes at 135° C. The resulting film was tough.

*Example 19*

Into a reactor, equipped with steam jacket, cooling coil, stirrer, batch thermometer, sampling syphon and reflux condenser was charged:

| | Parts |
|---|---|
| Petroleum ether (80–100° C. boiling range) | 1,250 |
| Mineral spirits | 750 |
| Methyl methacrylate | 450 |
| Butyl methacrylate | 50 |
| Benzoyl peroxide | 6 |
| Degraded rubber with a reduced viscosity in benzene of 0.68 unit as defined | 28 |

This charge was raised to reflux (at approximately 85° C.) and maintained there for 35 minutes, after which time a dilute, fine particle size dispersion of polymer had been formed. 6 parts of crude mixed primary $C_9$ mercaptans were added and then the following feed was dripped down the condenser into the returning reflux stream over 2½ hours:

Premixed:
    1500 parts of methyl methacrylate
    180 parts of butyl methacrylate
    4 parts of benzoyl peroxide The charge was cooked for 50 minutes after the last of the feed had been added and then cooled under inert gas.

The final product was a syrupy dispersion of moderately fine particle size (about ½$\mu$) but with some larger particles. The solids were approximately 50% and the overall molecular weight, as estimated from viscosity measurements, was of the order of 200,000.

The dispersion appeared stable to mechanical shear and was not markedly false bodied. When the dispersion was plasticised, for example, with the $C_6$, $C_7$ and $C_8$ esters of phthalic acid, and pigmented by incorporation of dispersed pigment, the resultant paints gave, after application and stoving for 30 minutes at 120° C., dull, hazy films which on rubbing down and polishing gave a brilliant gloss.

*Example 20*

Example 19 was repeated, using 55 parts of a degraded rubber of a reduced viscosity of 0.31 unit as defined.

The reaction proceeded normally and the final product, although slightly thick, was not gelled, and was readily dispersible in hydrocarbon diluents. The solids were approximately 52%, the particle size fine (mostly less than ⅓$\mu$) and the molecular weight of the polymer about 200,000.

This latex was made into paint as in Example 19 and, on evaluation, gave brilliantly glossy films.

*Example 21*

Example 20 was repeated using a rubber degraded to the maximum extent found practicable by hot mastication. Its reduced viscosity was 0.24 unit as defined. A significantly more fluid product, of similar size and slightly lower molecular weight was obtained. Paints made from this latex had the same excellent properties as those of Example 20.

*Example 22*

Example 20 was repeated using a commercial degraded rubber with a reduced viscosity of 0.44 unit as defined. Although not gelled, the final product was rather too viscous to be easy to handle at 50% solids. Paints made up in the usual way gave results substantially similar to those of Examples 20 and 21, with a marginal reduction in gloss.

*Example 23*

Examples 19, 20, 21 and 22 were repeated using a ratio of 83:17 methyl methacrylate:butyl methacrylate. Equivalent results were obtained.

*Example 24*

Examples 20 and 21 were repeated using 100% methyl methacrylate in place of the mixture of methacrylates.

Because of the greater polarity of the polymer the paints were made up using dibutyl phthalate and tri-tolyl phosphate as the plasticiser. Both gave brilliantly glossy films when suitably applied and stoved at temperatures about 100° C.

*Example 25*

Into a smaller version of the apparatus of Example 19 was charged:

| | Parts |
|---|---|
| Methyl methacrylate | 99 |
| Methacrylic acid | 1 |
| Odourless mineral spirits | 1,080 |
| Benzoyl peroxide | 4 |
| Degraded rubber with a reduced viscosity in benzene of 0.83 unit | 20 |

This charge was raised to 85° C. under inert gas and maintained at that temperature by manipulation of heating jacket and cooling coil for one hour when a fine particle size low solids latex had been formed. The gas was turned off and the reaction stopped by chilling to 60° C. The following feed was then added over 25 minutes with good stirring:

| | Parts |
|---|---|
| Methyl methacrylate | 1,180 |
| Methacrylic acid | 12 |
| Benzoyl peroxide | 3 |
| Primary octyl mercaptan | 3 |

The batch was again raised to 85° C. under inert gas, when an exothermic reaction resulted. 90 minutes later, the batch was cooled, yielding an apparently satisfactory, stable latex, slightly thick but not gelled. The particle size was fine (approximately ½μ with a few larger particles), the polymer molecular weight approximately 150,000, and the solids a little over 50%. Paints were made as in Example 19 but, in view of the nature of the polymer, the strong plasticisers, tri-tolyl phosphate and butyl benzyl phthalate, were used.

These paints gave films which could be polished to a high gloss.

*Example 26*

Example 25 was repeated using 40 parts of heavily degraded rubber, with a reduced viscosity of 0.325 unit as defined. The reaction proceeded normally and an excellent, fluid product of very fine particle size (largely below ⅓μ) was obtained. When converted into paint, as described in Example 25, products were obtained that gave brilliantly glossy films when suitably applied and stoved at temperatures of about 100° C.

This application is a continuation-in-part of applications Serial No. 848,923, filed October 27, 1959 now abandoned, and Serial No. 735,683, filed May 16, 1958 now abandoned.

We claim:

1. A process for producing a stable dispersion of a solid polymer in an inert relatively non-polar organic liquid in which the polymer is insoluble, which comprises polymerising at least one monomer selected from the group consisting of acrylic acid and methacrylic acid, lower esters, amides and nitriles thereof in said organic liquid and in the presence of a catalyst for the polymerisation of said monomer and rubber which is soluble in said organic liquid to form said stable dispersion of solid polymer in organic liquid.

2. A process as claimed in claim 1 in which the rubber is present in a proportion of from 0.1–10% by weight of said monomer.

3. A process as set forth in claim 1 in which the rubber is present in a proportion of from 1–5% by weight of the monomer.

4. A process as claimed in claim 1 in which the monomer is methyl methacrylate.

5. A process as set forth in claim 1 in which said organic liquid is an aliphatic hydrocarbon.

6. A process as set forth in claim 1 in which the rubber is natural rubber.

7. A process as set forth in claim 1 in which the catalyst is a free radical catalyst.

8. A polymer dispersion produced by the process of claim 1.

9. A polymer dispersion as claimed in claim 8 having a solid content of from 25–50%.

10. A coating composition comprising the polymer dispersion of claim 8.

11. A process for producing a stable dispersion of a solid polymer in an inert relatively non-polar organic liquid in which the polymer is insoluble, which comprises polymerising at least one monomer selected from the group consisting of acrylic acid and methacrylic acid, lower esters, amides and nitriles thereof in said organic liquid and in the presence of a catalyst for the polymerisation of said monomer and a member of the group consisting of organic block and graft copolymers of which one constituent is rubber which is soluble in said organic liquid and another constituent is insoluable in the organic liquid and compatible with the polymer being formed such that, if a film is cast from a solution containing said polymer and said compatible constituent in the same proportions as will be present in the dispersed particles, the film is clear.

12. A process as claimed in claim 11 in which the rubber constituent is present in an amount between 0.1 and 10% by weight of said solid polymer.

13. A process as claimed in claim 12 in which the rubber constituent is present in an amount between 0.5 and 5% by weight of said polymer.

14. A process as claimed in claim 11 in which said monomer is essentially said lower ester.

15. A process as claimed in claim 11 in which the rubber is degraded natural rubber.

16. A process as claimed in claim 11 in which the rubber has a molecular weight of at least 1,000.

17. A process as claimed in claim 11 in which the rubber has a molecular weight of 1,000 to 100,000, and said monomer is essentially said lower ester.

18. A process as claimed in claim 11 in which the rubber is degraded rubber having a reduced viscosity as defined of from 0.2 to 0.5, and said monomer is essentially said lower ester.

19. A process as claimed in claim 11 in which the rubber is degraded rubber having a reduced viscosity as defined of from 0.25 to 0.35, and said monomer is essentially said lower ester.

20. A polymer dispersion produced by a process of claim 11.

21. A coating composition comprising a polymer dispersion of claim 20.

22. A coating composition comprising a polymer dispersion produced by a process of claim 18, a plasticiser and a pigment.

References Cited in the file of this patent

UNITED STATES PATENTS

| | | |
|---|---|---|
| 2,097,263 | Strain | Oct. 26, 1937 |
| 2,275,951 | Farmer | Mar. 10, 1942 |
| 2,556,158 | West | June 12, 1951 |
| 2,561,951 | Roberts | July 24, 1951 |
| 2,656,297 | Davis et al. | Oct. 20, 1953 |
| 2,731,439 | Jones et al. | Jan. 17, 1956 |
| 2,744,085 | Hubbard | May 1, 1956 |
| 2,753,285 | Thomson | July 3, 1956 |
| 2,838,456 | Banes et al. | June 10, 1958 |
| 2,843,561 | Ingley et al. | July 15, 1958 |
| 2,916,465 | Reese | Dec. 8, 1959 |
| 2,946,702 | Bach | July 26, 1960 |
| 2,966,474 | Jurgeleit | Dec. 27, 1960 |

FOREIGN PATENTS

| | | |
|---|---|---|
| 593,072 | Great Britain | Oct. 8, 1947 |